US009530143B2

(12) United States Patent
Bender et al.

(10) Patent No.: US 9,530,143 B2
(45) Date of Patent: Dec. 27, 2016

(54) SYSTEMS AND METHODS FOR DETERMINING AD IMPRESSION UTILITY

(75) Inventors: Brian C. Bender, New York, NY (US); David S. Bonalle, New Rochelle, NY (US); Mehmet Dedeoglu, Plainsboro, NJ (US); Patrick R. Lowery, New York, NY (US); Tamara F. Odinec, New York, NY (US); Rajendra R. Rane, Edison, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 13/204,473

(22) Filed: Aug. 5, 2011

(65) Prior Publication Data

US 2013/0036014 A1 Feb. 7, 2013

Related U.S. Application Data

(63) Continuation of application No. 13/204,433, filed on Aug. 5, 2011, and a continuation of application No. 13/204,513, filed on Aug. 5, 2011.

(51) Int. Cl.
*G06Q 30/02* (2012.01)

(52) U.S. Cl.
CPC .......... *G06Q 30/02* (2013.01); *G06Q 30/0242* (2013.01); *G06Q 30/0251* (2013.01); *G06Q 30/0255* (2013.01); *G06Q 30/0269* (2013.01)

(58) Field of Classification Search
CPC .................................. G06Q 30/0207–30/0277
See application file for complete search history.

(56) References Cited

U.S. PATENT DOCUMENTS

| | | | |
|---|---|---|---|
| 2007/0078869 A1* | 4/2007 | Carr et al. .................... | 707/100 |
| 2009/0144201 A1 | 6/2009 | Gierkink et al. | |
| 2009/0234708 A1* | 9/2009 | Heiser et al. .................. | 705/10 |
| 2010/0262449 A1* | 10/2010 | Monteforte et al. .............. | 705/8 |
| 2011/0231246 A1 | 9/2011 | Bhatia et al. | |
| 2011/0231305 A1 | 9/2011 | Winters | |
| 2011/0264501 A1* | 10/2011 | Clyne .................... | G06Q 20/10 705/14.25 |
| 2011/0320259 A1* | 12/2011 | Roumeliotis et al. ..... | 705/14.41 |
| 2012/0016738 A1 | 1/2012 | Quimet | |
| 2012/0109802 A1 | 5/2012 | Griffin et al. | |

OTHER PUBLICATIONS

Office Action dated Feb. 14, 2012 in U.S. Appl. No. 13/204,513.
Final Office Action dated May 8, 2014 in U.S. Appl. No. 13/204,433.
Advisory Action dated Jul. 22, 2014 in U.S. Appl. No. 13/204,433.
(Continued)

*Primary Examiner* — David Stoltenberg
(74) *Attorney, Agent, or Firm* — Snell & Wilmer L.L.P.

(57) ABSTRACT

Various systems and methods for measuring ad impression effectiveness are provided. A method is provided comprising selecting, by an ad impression processor, a target consumer for an ad impression, delivering the ad impression to the target consumer, determining, by the processor, a behavior of the target consumer after a time period elapses, wherein the determining comprises analyzing internal data relating to the target consumer.

20 Claims, 3 Drawing Sheets

(56) References Cited

OTHER PUBLICATIONS

Final Office Action dated Aug. 2, 2013 in U.S. Appl. No. 13/204,513.
Office Action dated Aug. 21, 2013 in U.S. Appl. No. 13/204,433.
Office Action dated Jan. 15, 2015 in U.S. Appl. No. 13/204,513.
Office Action dated May 18, 2015 in U.S. Appl. No. 13/204,513.
Advisory Action dated Jan. 25, 2016 in U.S. Appl. No. 13/204,433.
Office Action dated Feb. 29, 2016 in U.S. Appl. No. 13/204,513.
Advisory Action dated Jul. 23, 2015 in U.S. Appl. No. 13/204,513.
Final Office Action dated Oct. 19, 2015 in U.S. Appl. No. 13/204,433.
Office Action dated Apr. 27, 2015 in U.S. Appl. No. 13/204,433.
Advisory Action dated Oct. 23, 2013 in U.S. Appl. No. 13/204,513.
Advisory Action dated Oct. 22, 2013 in U.S. Appl. No. 13/204,513.
Final Office Action dated Aug. 9, 2016 in U.S. Appl. No. 13/204,513.

* cited by examiner

SYSTEMS AND METHODS FOR DETERMINING AD IMPRESSION UTILITY

CROSS-REFERENCE TO RELATED APPLICATIONS

This application is a continuation of U.S. application Ser. No. 13/204,433, entitled SYSTEMS AND METHODS FOR DETERMINING AD IMPRESSION UTILITY, filed Aug. 5, 2011. This application is also a continuation of U.S. application Ser. No. 13/204,513 entitled SYSTEMS AND METHODS FOR DETERMINING AD IMPRESSION UTILITY filed Aug. 5, 2011. Both the '433 application and '513 application are incorporated herein by reference in their entirety.

FIELD

The disclosure generally relates to ad impression analysis, and more particularly, to systems and methods for determining ad impression utility.

BACKGROUND

Successful advertising campaigns are often an important component in a business's marketing strategy. However, it is often difficult to determine the effectiveness of particular ad impressions or campaigns. Effectiveness may include, for example, the rate at which the recipients of an ad impression purchase the item advertised, the increase in consumer goodwill that results from the ad impression, and/or the rate at which the recipients of an ad impression frequent a particular merchant. Moreover, it is difficult to determine the precise number of recipients of an ad impression that is broadcast (e.g., via television, radio and the like). Thus, it would be advantageous for systems and methods to determine both the effectiveness of an ad impression and to assist in the delivery and creation of effective ad impressions.

SUMMARY

Various systems and methods for determining the effectiveness of ad impressions are provided herein in various embodiments. A method is provided comprising selecting a target consumer for an ad impression, delivering the ad impression to the target consumer, and determining a behavior of the target consumer after a time period elapses, wherein the determining comprises analyzing internal data relating to the target consumer. Further, in various embodiments, methods are provided wherein the target consumer is a member of a plurality of target consumers and wherein each target consumer in the plurality of target consumers has a characteristic similar to the target consumer.

In still further embodiments, methods are provided further comprising selecting a plurality of control consumers that will not receive the ad impression, wherein each control consumer in the plurality of control consumers has the characteristic similar to the target consumer, determining a behavior of the plurality of control consumers after the time period elapses, wherein the determining comprises analyzing internal data relating to the plurality of control consumers, and comparing the behavior of the plurality of control consumers with the behavior of the plurality of target consumers.

A method is provided comprising determining, by an ad impression processor, a characteristic of a target consumer set, wherein the determining comprises analyzing internal data relating to the target consumer set; creating, by the processor, an ad impression in response to the characteristic; determining, by the processor, a target consumer who exhibits the characteristic; and, delivering, by the processor, the ad impression to the target consumer.

A method is provided comprising selecting, by a frequency of behavior processor, a consumer set having a similar characteristic; dividing, by the processor, the consumer set into a target consumer set and a control consumer set; delivering an ad impression to the target consumer set; determining, by the processor, a frequency of behavior of the target consumer set after a time period elapses by analyzing internal data relating to the target consumer set; determining, by the processor, the frequency of behavior of the control consumer set after the time period elapses by analyzing internal data relating to the control consumer set; comparing, by the processor, the frequency of behavior of the control consumer set to the frequency of behavior of the target consumer set.

BRIEF DESCRIPTION OF THE DRAWINGS

The above and other features and advantages are hereinafter described in the following detailed description of exemplary embodiments to be read in conjunction with the accompanying drawing figures, wherein like reference numerals are used to identify the same or similar parts in the similar views, and.

DETAILED DESCRIPTION

Figure 1:
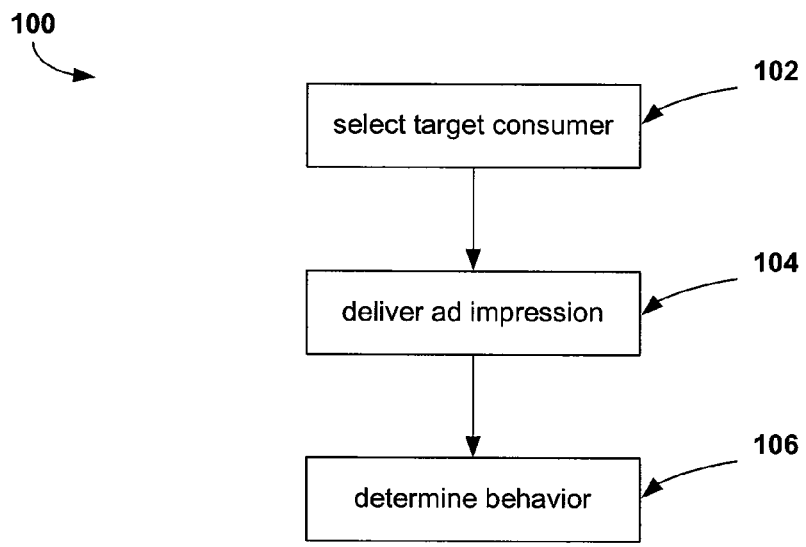
FIG. 1 illustrates a method of measuring ad impression effectiveness, according to various embodiments.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment. Terms similar to "connection" may include a partial or full connection and/or a partial or full interface.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles. The disclosure may be implemented as a method, system or in a computer readable medium.

Ad impressions, as used herein, may include any form of advertising or solicitation for any item that may influence a person or business entity to engage in a desired behavior. For example, an ad impression may be television commercial, a radio commercial, a print advertisement (e.g., an advertisement found in a newspaper, magazine, or handbill), a billboard, an electronic advertisement (e.g., an advertisement found on a web page or email, whether alone or with other content, a sponsored link, and/or an advertisement found in a software application, such as those available for various smartphones, as described herein), a direct mail advertisement, or a sponsored place or event such as a sponsored sports stadium name (e.g., Citi Field) or a sponsored race series (e.g., the Sprint Cup Series). Ad impressions may be broadcast in mass media and/or be targeted to specific recipients, such as through a targeted email advertisement campaign. Ad impressions may be distributed online to specific recipients or classes of recipients. Any ad impression may be distributed to specific recipients or classes of recipients, such as online advertisements and advertisements in magazines or newspapers that are personally printed for a given a person.

Ad impression effectiveness may include the rate at which people exposed to an ad impression engage in a behavior that is desired or beneficial to the sponsor of the ad impression. The desired behavior may be, for example, purchasing a particular target item (as used herein, a target item may include a product, a service, or a combination of both), purchasing an item that is a competitive with the particular target item, purchasing an item that is a complementary with the particular target item, visiting a particular merchant or geographic location, or consuming particular media content. Such ad impression effectiveness may be referred to as the acceptance rate for an ad impression. Ad impression effectiveness may also include other components, such as a measure of the negative goodwill the ad impression may provide to recipients. For example, an ad impression that is provocative may have a high rate of acceptance but may also generate a high level of negative goodwill.

The format, design, and/or content of an ad impression may be referred to as ad impression strength. For example, a stronger ad impression may be one that has greater ad impression effectiveness than another ad impression, controlling for other variables. The timing and targeting of an ad impression may be referred to as ad impression precision. For example, a television ad during a large sporting event has low ad impression precision, as the audience is a broad-based, mass audience. A television ad during a television show that has a narrow demographic audience may thus be more precise. More precise still would be an online advertisement appearing in or near search engine results, or with even more precision, an online advertisement sent to a smartphone that is located near (either in space or time) a particular item and where the smartphone user is known to purchase the particular item or a competitive item at that time or in that space. For example, a smartphone application that displays a coffee shop advertisement when the smartphone is within two blocks of the coffee shop is a precise ad impression.

Business entities (for example, merchants) may improve their ad impressions and/or ad impression effectiveness by harnessing data related to customers and/or consumers behaviors. As used herein, the term "consumer" may mean any person or entity that consumes or uses a particular item. As used herein, a customer may mean a person or entity that has purchased and/or may purchase in the future a particular item from a given business entity, such as a merchant. Thus, a customer list may be a list of people or entities that have purchased or may purchase a particular item from another entity, such as a merchant.

In various embodiments, consumer behavior may be determined by using internal data. "Internal data" and terms similar to "internal data" may include any data a credit issuer possesses or acquires pertaining to a particular consumer or group of consumers. Internal data may be gathered from a transaction system, such as a closed loop transaction system. Internal data may be gathered before, during, or after a relationship between the credit issuer and the transaction account holder (e.g., the consumer or buyer). Such data may include consumer demographic data. Consumer demographic data may include any data pertaining to a consumer. Consumer demographic data may include consumer name, gender, age, address (including ZIP code and 4 digit extension, also known as "ZIP+4"), telephone number, email address, employer and social security number. Consumer transactional data may include any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Internal data from, for example, a closed loop transaction system, may comprise transactional behaviors for a large number of individuals. In addition, internal data may include transaction details such as time, geographic location, and amount. By analyzing such information with data relating to the exposures to ad impression, the effects of the ad impression may become apparent. A large sample of internal data improves the ability of one to evaluate ad impressions.

In various embodiments, ad impression effectiveness may be improved by appropriate selection of a target consumer using, in various embodiments, analysis of internal data, among other factors. For example, with reference to ad impression delivery 100 in FIG. 1, select target consumer 102 is performed. Select target consumer 102 may comprise analysis of internal data of potential target consumers.

Target consumers may be selected by selecting any single datum or combination of internal data and/or other consumer data that may be joined, merged, and/or otherwise associated with internal data. For example, select target consumer 102 may select target consumer based on the time, location, and content of prior purchase, annual income level, home ZIP+4 code, household or individual size of wallet or share of wallet, consumer gender, consumer age, consumer identified as reaching a certain level of spend in a given sales cycle, consumers who have made purchases through a particular sales channel, consumers who have responded to marketing campaigns based on specific offer types, product bundling/product types, specific seasons, marketing creative and specific advertising/marketing channels, consumers who are defined as high value through purchase amount (i.e., historical transactional amount), consumers geographic information (including instantaneous geographic information obtained from a digital device such as a GPS-equipped smartphone and historical instantaneous geographic information obtained from similar sources) consumers preference for a particular merchant or type of merchant, consumers media preference or psychographic information (e.g., consumers preference of NPR over Fox News), consumers defined by the sequence of products that a consumer purchases (e.g., TV, computer, printer, ink), consumers response to surveys, consumers data collected by third parties (including credit bureaus), consumers satisfied with a particular product or brand, consumers who attrite, consumers who make an insurance claim, consumers who have been identified as providing a particular level of return on investment or return to a merchant based on marketing initiatives or purchase history, consumers who have viewed a merchant's social network page, ad, and/or feed (e.g., a Facebook, MySpace, and/or LinkedIn page and/or a Twitter or RSS feed), other social network ad; television ad, consumers' viewing of an advertising channel which lead to a sale or other action, consumers who have a high or low opinion of a particular merchant's brand(s), or any other event or data point that may allow matching or joining with internal data.

In addition, data from third parties (e.g., credit bureaus or other sources) may be used in a select target consumer 102. For example, a third party data sources may provide customer credit scores, social network histories (which include any information a social network may gather regarding a consumer, for example, posted messages, approximate age and gender of spouse, children and other members of household, pictures, past consumer geographic locations, patterns of past consumer geographic locations, propensity to engage in risky behaviors and the frequency of engaging in the same, marital status, substance use history, dating history, education level, present and past health status including disease status), public records, consumer transactions conducted using alternate payment systems, consumer health status, and any other data relating to consumers who may appear in the internal data.

Select target consumer 102 may comprise, for example, selecting a consumer who has purchased an average of over $200 per month over a given calendar year on fine dining or, also for example, selecting a consumer who has purchased over $1,000 from a luxury retailer in a given month, or, also for example, selecting a consumer who has purchased over $1,000 worth of golf related products and services over a given prime golf season. For example, select target consumer 102 may comprise selecting consumers who have automobile installment loans with an in-house luxury car financing company, an in-house mass market car financing company, and/or a subprime lender.

Select target consumer 102 thus results in the identification of a target consumer or target consumer set that will receive an ad impression. Personally identifiable information regarding the target consumer need not be known, but rather that the target consumer may have certain characteristics as determined in select target consumer 102.

Deliver ad impression 104 may comprise delivering an ad impression via broadcast and/or via specific delivery that may reach a target consumer or target consumer set. A broadcast ad impression may be a television commercial or radio commercial. A specific delivery may be an appearance of an online ad impression, a print ad impression in a given print publication's subscriber's edition, an ad impression delivered to a personal device of a consumer (e.g., iPod, iPad, smartphone, etc) and/or any delivery method having a reasonably ascertainable recipient.

Determine behavior 106 may comprise determining a behavior of a target consumer or target consumer set. A behavior may include participation in one or more transactions, the lack of participation in one or more transactions, and/or the participation in a trip or other event. Behaviors may be determined by analysis of internal data relating to the target consumer or target consumer set. Internal data may be searched for transactional records that may implicate the ad impression. In many cases, the ad impression may be associated with a transaction involving a particular merchant or in a particular geographic area.

The behaviors determined in determine behavior 106 may then be associated with the ad impression delivered in deliver ad impression 104. In certain cases, the ad impression may contemplate purchase of a particular item that may be purchased at a variety of merchants. For example, the ad impression for a NIKON camera may lead to a transaction at a camera store, though the internal data may reveal only a transaction involving a camera store. To strengthen the association between the transaction record of internal data and the ad impression, estimation may be used. For example, an ad impression for a $1,000 NIKON camera may be associated with a transaction between the target consumer and a camera store totaling $1,200, which may include tax and/or the purchase of accessories. To further strengthen the association between the transaction record of internal data and the ad impression, SKU level data from the camera store may be merged or joined with the internal data. In such a manner, the $1,200 purchase may be definitively identified as a transaction involving the camera of the ad impression or, in the alternative, may confirm that the purchase of a competing camera (e.g. sale of a CANON camera) or a higher level camera of the brand in the ad impression (e.g., sale of a NIKON D700 over a NIKON D300s). In other examples, the ad impression contemplates that the target consumer travel to a particular destination. Thus, an ad impression delivered to a Minnesota resident contemplating a winter trip to Arizona may be associated with transactions occurring in Scottsdale, Ariz.

Association of an ad impression and internal data may be performed in any suitable manner. For example, the data related to the ad impression and internal data may be joined or otherwise merged. Performing a join, for example, may be accomplished using any join function known in the art, as described herein. For example, a search or join may be performed to match records from one data set to another. For example, a join may be performed on a target consumer that was exposed to an ad impression for a connection to the item contemplated by the ad impression. The join may utilize a range of data depending upon the desired results, and the join query may account for differences in time stamps across various systems. For example, if a join fails to return any results, the transaction time may be altered slightly in the event the internal data is a few seconds or minutes different from the first merchant data. As an example, for table ad_table having a consumer_id column, a transaction_merchant column and a received_ad_imp column and a table internal_data having internal data, the following query may be used to obtain a consumer who engaged in a transaction with the first merchant: SELECT transaction_date, transaction_time, transaction_amount, transaction_merchant FROM internal_data WHERE ad_table.consumer=internal_data.consumer_id AND ad_table.received_ad_imp=Y AND ad_table.transaction_merchant=internal_data.transaction_merchant The time between ad impression delivery and a transaction associated with the ad impression may also be calculated. Moreover, ad impression effectiveness may thus be measured. For example, if many target consumers in a target consumer set are exposed to the ad impression and a proportionally high number of those target consumer engage in a transaction contemplated by the ad impression, the ad impression may be considered to have high ad impression effectiveness.

Figure 2:
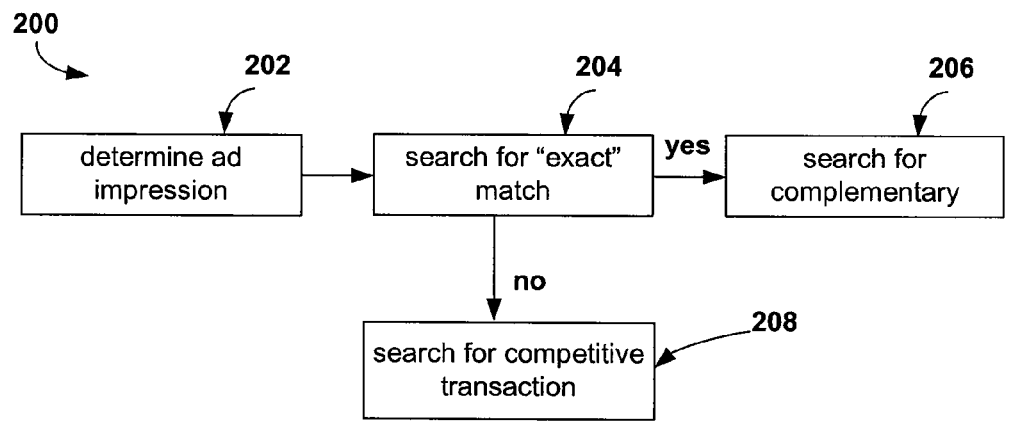
FIG. 2 illustrates a method of determining behavior, according to various embodiments.

The process of determine behavior 106 is shown in more detail in process 200 of FIG. 2. Determine ad impression 202 may comprise retrieving which ad impression was delivered to a target consumer. Then, search for exact match 204 is performed, as described above. The exact match may comprise a transaction that definitively or nearly definitively demonstrates a behavior that is consistent with a delivered ad impression. For example, as described above, if a search of internal data revealed a transaction at a particular merchant after an ad impression for the merchant was viewed, then an exact match would be found. An exact match may also comprise a nearly definitive match, which would comprise a transaction at a merchant that sells an item displayed in the ad impression where the transaction amount was near the amount the item typically costs. This may be the manufacturer's suggested price, or a range of other discounted prices given the selling merchant. For example, a television sold at a retail store may sell closer to the manufacturer's suggested price than the same television sold at a warehouse store. As described above, third party data sources may be used to transform a nearly definitive match to a definitive match.

If an exact match is found in exact match 204, search for complementary 206 is performed. Search for complementary 206 may comprise a search for the target consumer purchasing a complementary item than the item contemplated by the ad impression. For example, an ad impression for a television may yield a consumer transaction at a warehouse chain. The warehouse chain may provide SKU level data to merge with internal data. Thus, it may be found that the consumer also purchased a wall mounting set or additional cables. Also for example, an ad impression for a baseball game may be associated with the target consumer frequenting a dining establishment prior to the baseball game and/or a bar after the baseball game.

If search for exact match 204 does not yield an exact match, search for competitive transaction 208 is performed. Search for competitive transaction 208 may comprise a search for the target consumer purchasing a competitive item than the item contemplated by the ad impression. For example, a consumer exposed to an ad impression for an Apple Macintosh may have internal data relating to the purchase of a Dell PC. A competitive transaction may also be of an item slightly above or below the price point of an ad impression. Such information may assist businesses in setting price points below that of higher end items but above lower quality items. For example, if an ad impression contemplates purchase of a certain brand of car and the target consumer is later determined to be purchasing a competing car from a more "upmarket brand," it may be considered a competitive transaction, even if the two cars are not per se competitors.

Figure 3:
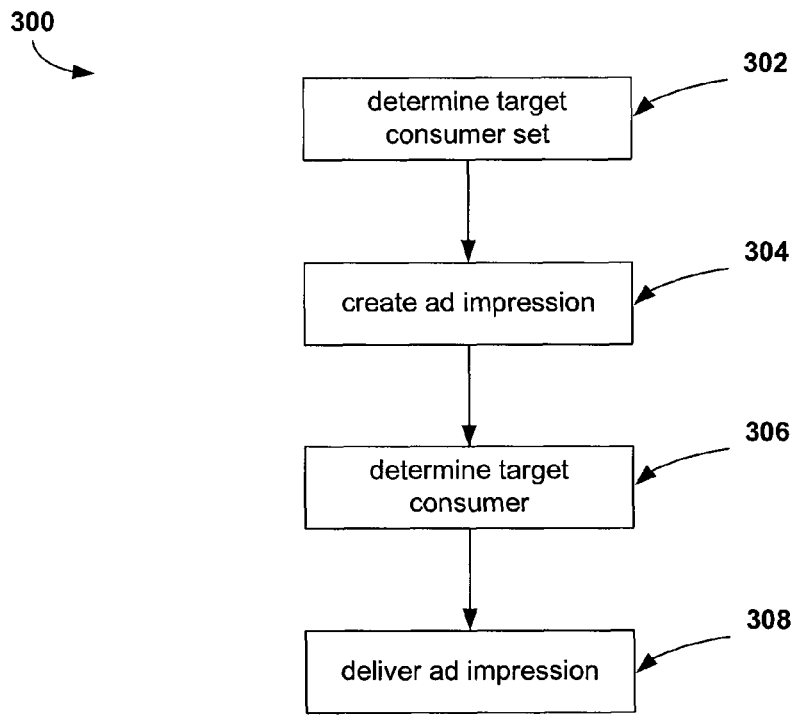
FIG. 3 illustrates a method of creating an ad impression, according to various embodiments.

In various embodiments, ad impression strength may be improved. Ad impression strength process 300 is shown in FIG. 3. Determine target consumer set 302 is shown. Determine target consumer set 302 may comprise identifying consumer's that may be receptive to certain ad impressions. Receptiveness to ad impressions may be measured through for example, one or more iterations of ad impression delivery 100. Stated another way, a consumer may be tracked over a period of time to determine which ad impressions are effective for a particular consumer. The effective ad impressions may then be analyzed for common themes or elements or channels. For example, a consumer may be more receptive to online ad impressions over television ad impressions, or ad impressions delivered via smartphone or tablet app than over an internet search engine screen. Also for example, a consumer may be more receptive to ad impressions that are humorous or light hearted as opposed to ad impressions that are more serious in tone. Receptiveness to ad impressions may also be measured through frequent transactions or geographic locations. For example, a target consumer set may frequent a particular train or bus route on weekdays or may travel a particular road on weekdays. Such consumers may then be receptive to ad impressions that contemplate transactions that may occur with minimal disruption to daily commuting or transactions that would alter the daily commute, such as real estate ad impressions for real estate close to large office buildings or an urban center. Consumers that frequently engage in transactions with a baby superstore may thus be more receptive to ad impressions for baby related items.

The receptiveness of a target consumer set to various ad impressions or to types of ad impressions, as determined in determine target consumer set 302, may be used in created impression 304. Create ad impression 304 may be any process that changes or creates the look, sound, or other perceptible qualities of an ad impression or brand name. Create ad impression 304 may thus comprise the complete design of an ad impression or the modification of an existing ad impression. Create ad impression 304 may comprise selecting elements of ad impression that are associated with enhanced ad impression effectiveness amongst certain target consumers to incorporate into another ad impression. Thus, ad impressions that have a definite, tangible result on motivating consumer behavior may be selected for use to create additional successful ad impressions. Create ad impression 304 may also depend upon the particular target consumer as performed in determine target consumer 306 and time and delivery of the ad impression, as performed in deliver ad impression 308.

For example, it may be found that a target consumer set is more receptive to automobiles having model names that are comprised of letters and numbers rather than a complete word. Other target consumer sets, however, may be receptive to model names that include a complete word. Thus, depending on the selected target consumer set, an ad impression or brand name (here, a car model name), may be selected accordingly. Also for example, a target consumer set may be more receptive to text-rich print ad impressions delivered in a news magazine, while another target consumer set may be more receptive to print ad impressions that comprise photographs and minimal wording. In a further example, it may be found that a target consumer may be more receptive to ad impressions for companies that appear to be locally run or operated, or that create organic or "artisan" type items. In a still further example, it may be found that a target consumer set may be receptive to online ad impressions than television ad impressions.

Create ad impression 304 may also depend upon the time and delivery of the ad impression, as performed in deliver ad impression 308. For example, a target consumer set may comprise consumers who engage in transactions at a particular gourmet coffee shop between 5 am and 7 am on week days. A doughnut shop in the same area (and, indeed, in the same shopping center or on the same block) may thus create an ad impression that emphasizes their reasonably priced, gourmet-style coffee and its fast service. Deliver ad impression, as described herein, may then deliver the ad impression to a target consumer's smartphone during a morning commute to work. Also for example, a print ad impression may be customized for target consumers in a particular geographic region. Thus, a magazine may print ad impressions that vary by locality.

In response to an ad impression being created in create ad impression 304, determine target consumer 306 determines a specific target consumer for the ad impression. The target consumer determined by determine target consumer 306 may have a similar ad impression receptiveness as those of the target consumer set found in determine target consumer set 302. The target consumer set may share one or more characteristics, but in various embodiments may differ in certain characteristics as well. For example, a target consumer set may comprise those receptive to loud, colorful television advertisements who frequently engage in transactions with "big box" discount stores. A target consumer may be a consumer that is receptive to loud, colorful television advertisements, but not necessarily a frequent customer of "big box" discount stores. By associating characteristics of the target consumer set with the target consumer, ad impression effectiveness tends to increase.

Figure 4:
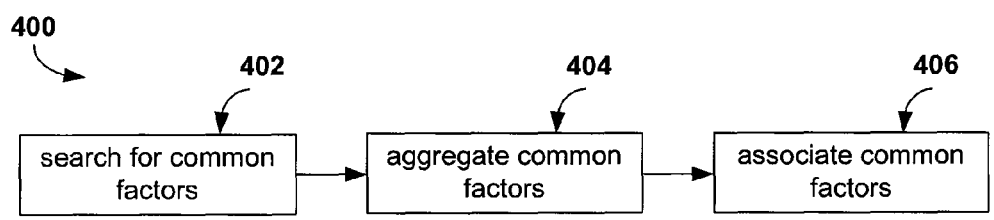
FIG. 4 illustrates a method of determining the target consumer, according to various embodiments.
Figure 5:
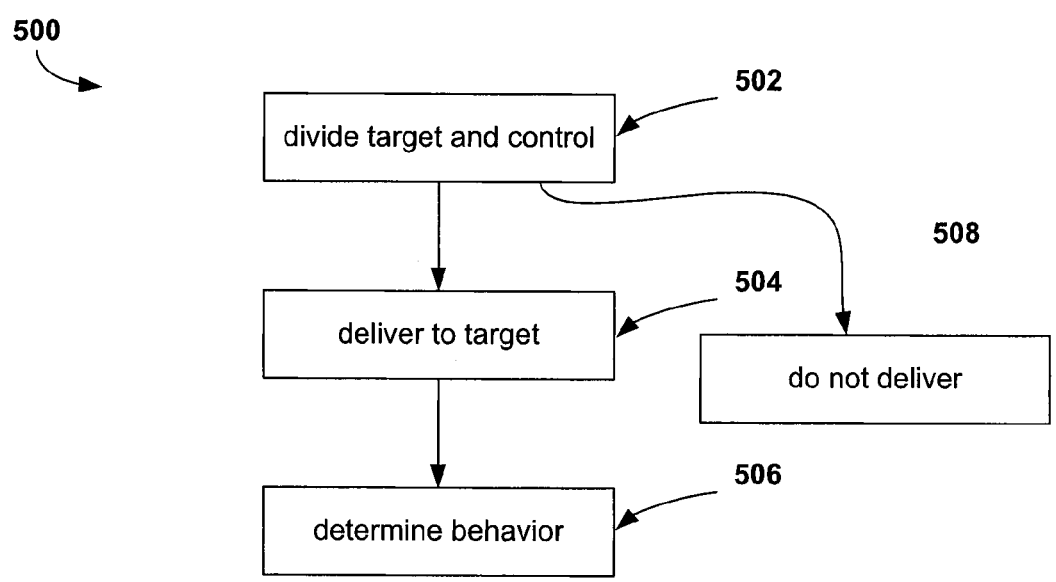
FIG. 5 illustrates a method of measuring ad impression effectiveness against a control, according to various embodiments.

Determine target consumer 306 may comprises process 400, found in FIG. 4. Search for common factors 402 identifies common characteristics of a target consumer set. Aggregate commons factors 404 gathers the common factors together for ease of analysis. Associate common factors comprises the association of the aggregate common factors with potential target consumers so that the target consumer may be identified.

With reference back to FIG. 3, deliver ad impression 308 comprises selecting and transmitting the ad impression in a delivery channel. While a specific target consumer may be sent a specific ad impression, the ad impression may be delivered in response to a search of a web search engine or a request for a geographic location. Deliver ad impression 308 may comprise a broadcast distribution such as a television commercial.

In various embodiments, ad impression effectiveness is measured as in measurement 500. Divide target and control 502 comprises both identifying a consumer set and dividing consumer set into a target consumer set and a control consumer set. The target consumer set and the control consumer set may be of the same size (i.e., number of consumers), though in various embodiments the target consumer set and the control consumer set are not of the same size. In various embodiments, the assignment of a consumer in the consumer set to either the control consumer set or the target consumer set is completed randomly, or as close to randomly as possible.

Deliver to target 504 comprises delivery of an ad impression to the target consumer set. Do not deliver 508 comprises the withholding of the ad impression from the control consumer set. The withholding may occur at the same time of deliver to target 504, or it may occur at other times. For example, if an ad impression is intended to be seen by a consumer set of five thousand commuters on a train route, twenty five hundred of the target consumer set may be exposed to the ad impression for a nearby coffee shop via a smartphone application while twenty five hundred in the control consumer set are not exposed to the ad impression.

Determine behavior 506 comprises determining the behavior (e.g., the frequency of behavior) of the target consumer set and the control consumer set. In various embodiments, internal data related to both the target consumer set and the control consumer set is used in determine behavior 506. For example, given the example above relating to commuters on a train, the transactions of the target consumer set are evaluated against the control consumer set. If the coffee shop that was the subject of the ad impression experiences a higher rate of transactions or a higher average per ticket for transactions among the target consumer set than observed in the control consumer set, and that difference is statistically significant, the ad impression may be considered to have had an effect on consumer behavior.

The improvement of ad impression effectiveness is important across a variety of industries and businesses. Nearly every business markets itself in some fashion, and the herein described methods and systems allow for improved measuring of ad impression effectiveness that uses actual transactional data.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor;

and a plurality of databases. Various databases used herein may include: internal data, client data; merchant data; financial institution data; and/or like data useful in the operation of the system. As those skilled in the art will appreciate, a computer may include an operating system (e.g., Windows NT, 95/98/2000, XP, Vista, OS2, UNIX, Linux, Solaris, MacOS, iOS, Android, etc.) as well as various conventional support software and drivers typically associated with computers. A user may include any individual, business, entity, government organization, software and/or hardware that interact with a system.

A web client includes any device (e.g., personal computer or smartphone or tablet computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, personal computers, such as tablet computers (e.g., tablets running Android, iPads), iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, Opera, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile/XP/Vista/7, OS2, UNIX, Linux, Solaris, MacOS, MacOS X, PalmOS, iOS, Android, etc.) as well as various conventional support software and drivers typically associated with computers. A web client may include any suitable personal computer, network computer, workstation, personal digital assistant, cellular phone, smartphone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, various components, modules, and/or engines of a system may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device), personal digital assistant/smartphone (e.g., iPhone®, Palm Pilot®, Blackberry®, and/or a device running Android), cellular phone, kiosk, etc., online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems. Any form of encryption may be used to implement a secure channel, as described herein.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like.

Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank may have a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks. A transaction system may comprise a payment network.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

The process flows and screenshots illustrated or described are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements, but also to the various system components as described herein.

The computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases similar to a "payment processor" may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/ or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to "vendor software" or "vendor" may include software, hardware and/or a solution provided from an external vendor (e.g., not part of the merchant) to provide value in the payment process (e.g., risk assessment).

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in *In Re Nuijten* to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of operating an electronic ad impression network comprising:
   determining, by an ad impression processor of the electronic ad impression network, a characteristic of a target consumer set derived by the electronic ad impression network from a closed loop transaction system network, wherein the determining comprises analyzing internal data comprising at least one of a key field partition or a Binary Large Object (BLOB), and relating to the target consumer set, wherein the internal data relates to each target consumer of the target consumer set according to at least one of the key field partition or an annotation indicator of the BLOB;

creating, by the processor, an ad impression comprising an electronic advertisement in response to the characteristic, wherein the internal data and the ad impression are placed on separate file systems, and wherein in/out ("I/O") bottlenecks are reduced such that the efficiency of the network is improved;

wherein the creating comprises:
  selecting a format element to incorporate into the ad impression based on element effectiveness data,
  selecting a design element to incorporate into the ad impression based on the element effectiveness data, and
  selecting a content element to incorporate into the ad impression based on the element effectiveness data,
  wherein the format element, the design element, and the content element are components of an ad impression strength;

wherein the element effectiveness data indicates that the element is associated with enhanced ad impression effectiveness among the target consumer set;

determining, by the processor, a target consumer who exhibits the characteristic;

delivering, by the processor, the ad impression to the target consumer, wherein the delivering comprises:
  selecting a time to deliver the ad impression based on element time effectiveness data,
  wherein the time to deliver is a component of an ad impression precision,
  wherein the element time effectiveness data indicates that the element is associated with the enhanced ad impression effectiveness at a particular time; and
  selecting a delivery method of the ad impression based on both of:
    (i) element target effectiveness data,
    wherein the element target effectiveness data indicates that the delivery method is associated with enhanced ad impression effectiveness among the target consumer set, and
    (ii) element viewership effectiveness data,
    wherein the element viewership effectiveness data indicates that the target consumer set is likely to view the ad impression in response to being delivered by a particular delivery method at the time to deliver,
    wherein the delivering includes the ad impression having the ad impression strength and the ad impression precision, and
    wherein the efficiency of the network is improved,
    wherein the element viewership effectiveness data is based on at least one of a target consumer set activity or target consumer set location, storing, by the processor, target data, on a file system separate from the file system of the ad impression, wherein in/out ("I/O") bottlenecks are reduced such that the efficiency of the network is improved;

wherein the target data indicates the behavior of the target consumer, and wherein the target data permits tracking the target consumer over time to evaluate ad impression effectiveness; and analyzing, by the processor, the target data, the analyzing comprising:
  identifying a travel destination associated with the ad impression; and
  determining whether the target data indicates that the target consumer engaged in a transaction at the travel destination.

2. The method of claim 1, wherein the characteristic is at least one of a transactional history, a history of ad impression effectiveness, a history of receptiveness to an ad impression quality, or an annual income level.

3. The method of claim 1, wherein the ad impression is an online ad impression.

4. The method of claim 1, wherein the creating comprises selecting ad impression content in response to the characteristic.

5. The method of claim 1, further comprising analyzing the internal data relating to the target consumer to determine whether the target consumer engaged in a transaction contemplated by the ad impression.

6. The method of claim 5, further comprising analyzing the internal data relating to the target consumer to determine whether the target consumer engaged in a transaction similar to the transaction contemplated by the ad impression.

7. The method of claim 6, further comprising analyzing the internal data relating to the target consumer to determine whether the target consumer engaged in a transaction with a competitor of a sponsor of the ad impression.

8. The method of claim 1, further comprising analyzing the internal data relating to the target consumer to determine whether the target consumer engaged in a transaction with a competitor of a sponsor of the ad impression.

9. An electronic ad impression network system comprising:
  a non-transitory memory communicating with an ad impression processor,
  the non-transitory memory having instructions stored thereon that, in response to execution by the processor of the electronic ad impression network, cause the processor to perform operations comprising:
    determining, by the processor of the electronic ad impression network, a characteristic of a target consumer set derived by the electronic ad impression network from a closed loop transaction system network,
    wherein the determining comprises analyzing internal data comprising at least one of a key field partition or a Binary Large Object (BLOB), and relating to the target consumer set,
    wherein the internal data relates to each target consumer of the target consumer set according to at least one of the key field partition or an annotation indicator of the BLOB;
    creating, by the processor, an ad impression comprising an electronic advertisement in response to the characteristic,
    wherein the internal data and the ad impression are placed on separate file systems, and
    wherein in/out ("I/O") bottlenecks are reduced such that the efficiency of the network is improved,
    wherein the creating comprises:
      selecting a format element to incorporate into the ad impression based on element effectiveness data, selecting a design element to incorporate into the ad impression based on the element effectiveness data, and selecting a content element to incorporate into the ad impression based on the element effectiveness data, wherein the format element, the design element, and the content element are components of an ad impression strength;

wherein the element effectiveness data indicates that the element is associated with enhanced ad impression effectiveness among the target consumer set;

determining, by the processor, a target consumer who exhibits the characteristic;

delivering, by the processor, the ad impression to the target consumer, wherein the delivering comprises:

selecting a time to deliver the ad impression based on element time effectiveness data, wherein the time to deliver is a component of an ad impression precision, wherein the element time effectiveness data indicates that the element is associated with the enhanced ad impression effectiveness at a particular time; and selecting a delivery method of the ad impression based on both of:

(i) element target effectiveness data, wherein the element target effectiveness data indicates that the delivery method is associated with enhanced ad impression effectiveness among the target consumer set, and (ii) element viewership effectiveness data, wherein the element viewership effectiveness data indicates that the target consumer set is likely to view the ad impression in response to being delivered by a particular delivery method at the time to deliver, wherein the delivering includes the ad impression having the ad impression strength and the ad impression precision, and wherein the efficiency of the network is improved, wherein the element viewership effectiveness data is based on at least one of a target consumer set activity or target consumer set location;

storing, by the processor, target data, on a file system separate from the file system of the ad impression, wherein in/out ("I/O") bottlenecks are reduced such that the efficiency of the network is improved;

wherein the target data indicates the behavior of the target consumer, and wherein the target data permits tracking the target consumer over time to evaluate ad impression effectiveness; and analyzing, by the processor, the target data, the analyzing comprising:

identifying a travel destination associated with the ad impression; and determining whether the target data indicates that the target consumer engaged in a transaction at the travel destination.

10. The system of claim 9, wherein the characteristic is at least one of a transactional history, a history of ad impression effectiveness, a history of receptiveness to an ad impression quality, or an annual income level.

11. The system of claim 9, wherein the ad impression is an online ad impression.

12. The system of claim 9, wherein the creating comprises selecting ad impression content in response to the characteristic.

13. The system of claim 9, wherein the operations further comprise analyzing the internal data relating to the target consumer to determine whether the target consumer engaged in a transaction contemplated by the ad impression.

14. The system of claim 13, wherein the operations further comprise analyzing the internal data relating to the target consumer to determine whether the target consumer engaged in a transaction similar to the transaction contemplated by the ad impression.

15. The system of claim 14, wherein the operations further comprise analyzing the internal data relating to the target consumer to determine whether the target consumer engaged in a transaction with a competitor of a sponsor of the ad impression.

16. The system of claim 9, wherein the operations further comprise analyzing the internal data relating to the target consumer to determine whether the target consumer engaged in a transaction with a competitor of a sponsor of the ad impression.

17. A computer readable medium bearing instructions that, in response to being executed by an ad impression processor of an electronic ad impression network, cause the processor to perform operations comprising:

determining, by the processor of the electronic ad impression network, a characteristic of a target consumer set derived by the electronic ad impression network from a closed loop transaction system network, wherein the determining comprises analyzing internal data comprising at least one of a key field partition or a Binary Large Object (BLOB), and relating to the target consumer set, wherein the internal data relates to each target consumer of the target consumer set according to at least one of the key field partition or an annotation indicator of the BLOB;

creating, by the processor, an ad impression comprising an electronic advertisement in response to the characteristic, wherein the internal data and the ad impression are placed on separate file systems, and wherein in/out ("I/O") bottlenecks are reduced such that the efficiency of the network is improved, wherein the creating comprises:

selecting a format element to incorporate into the ad impression based on element effectiveness data, selecting a design element to incorporate into the ad impression based on the element effectiveness data, and selecting a content element to incorporate into the ad impression based on the element effectiveness data, wherein the format element, the design element, and the content element are components of an ad impression strength;

wherein the element effectiveness data indicates that the element is associated with enhanced ad impression effectiveness among the target consumer set;

determining, by the processor, a target consumer who exhibits the characteristic;

delivering, by the processor, the ad impression to the target consumer, wherein the delivering comprises:

selecting a time to deliver the ad impression based on element time effectiveness data, wherein the time to deliver is a component of an ad impression precision, wherein the element time effectiveness data indicates that the element is associated with the enhanced ad impression effectiveness at a particular time; and selecting a delivery method of the ad impression based on both of:

(i) element target effectiveness data, wherein the element target effectiveness data indicates that the delivery method is associated with enhanced ad impression effectiveness among the target consumer set, and (ii) element viewership effectiveness data, wherein the element viewership effectiveness data indicates that the target consumer set is likely to view the ad impression in response to being delivered by a particular delivery method at the time to deliver, wherein the delivering includes the ad impression having the ad impression strength and the ad impression precision, and wherein the efficiency of the network is improved, wherein the element viewership effectiveness data is based on at least one of a target consumer set activity or target consumer set location, storing, by the processor, target data, on a file system separate from the file system of the ad impression, wherein in/out ("I/O") bottlenecks are reduced such that the efficiency of the network is improved;

wherein the target data indicates the behavior of the target consumer, and wherein the target data permits tracking the target consumer over time to evaluate ad impression effectiveness; and analyzing, by the processor, the target data, the analyzing comprising:

identifying a travel destination associated with the ad impression; and determining whether the target data indicates that the target consumer engaged in a transaction at the travel destination.

18. The computer readable medium of claim 17, wherein the characteristic is at least one of a transactional history, a history of ad impression effectiveness, a history of receptiveness to an ad impression quality, or an annual income level.

19. The computer readable medium of claim 17, wherein the ad impression is an online ad impression.

20. The computer readable medium of claim 17, wherein the creating comprises selecting ad impression content in response to the characteristic.

* * * * *